Oct. 13, 1953 F. X. REES 2,655,644

REMOTE-CONTROL SYSTEM

Filed Nov. 12, 1952 3 Sheets-Sheet 1

INVENTOR.

Frank X. Rees

INVENTOR.

Frank X. Rees

Oct. 13, 1953

F. X. REES 2,655,644

REMOTE-CONTROL SYSTEM

Filed Nov. 12, 1952

3 Sheets-Sheet 3

INVENTOR.

Frank X. Rees

Patented Oct. 13, 1953

2,655,644

UNITED STATES PATENT OFFICE 2,655,644

REMOTE-CONTROL SYSTEM

Frank X. Rees, Chili, N. Y.

Application November 12, 1952, Serial No. 320,041

2 Claims. (Cl. 340—163)

This invention relates to remote control systems for governing the operation from a mobile unit of electric lamps, power operated doors, door locks, and other devices located at a fixed station.

Generally speaking, and without attempting to define the scope of the present invention, a carrier current control system is provided which is particularly adapted to have its transmitter located in a mobile unit, and to have its receiver, together with a multiple aspect signal, located near devices to be controlled at a fixed location or station, with the signal disposed within convenient view of an operator of the transmitter on the mobile unit.

Although the system has the facility of being able to communicate any one or more of several distinctive controls, the mobile transmitter is kept simple, with no stepping switch or coding being required. This is because the designation of desired controls for transmission from the mobile unit is done in accordance with the actuation of manually operable means simultaneously with the display of respective aspects of the signal, indicative of the time period or step selected solely by the receiving apparatus. That is, the system requires but one stepping switch, this being at the receiving station. Upon initiation of transmission, the stepping switch at the receiver station is initiated, and it is operable when initiated to scan all of the steps provided. The respective aspects of the signal (one for each step) are scanned as the stepping progresses.

This switch scans the different controls for the respective devices, but fails to operate the device associated with any step unless the manually operable means of the mobile transmitter is actuated simultaneously with the step being taken, as indicated by the aspect displayed by the signal.

An object of the present invention is to provide a remote control system having a transmitter in a mobile unit and receiving apparatus at a fixed station, wherein the receiving apparatus includes a stepping switch and a signal having distinctive aspects governed by the respective steps, this signal being disposed so as to be visible to the operator of the mobile unit transmitter so that he can designate transmission during any desired step as indicated by the signal.

Another object of the present invention is to provide a system of communication wherein stepping progresses at a receiving station subsequent to the depression of a pushbutton, or the like, at the transmitting station, no other control being communicated except the restoration of the pushbutton to its normal position during a selected step.

Another object of the present invention is to cause the communication of a control, during the complete scanning by the stepping switch, for each step in which the transmitter button is actuated from its depressed to its normal position.

Other objects, purposes and characteristic features of the present invention will be in part obvious from the accompanying drawings, and in part pointed out as the description progresses.

In describing the invention in detail, reference will be made to the accompanying drawings, in which like reference characters designate corresponding parts throughout the several views, and in which.

For the purpose of simplifying the illustration and facilitating the explanation, the various parts and circuits constituting the embodiment of the present invention have been shown diagrammatically and certain conventional illustrations have been employed, the drawings having been made more with the purpose of making it easy to understand the principles and mode of operation than with the idea of illustrating the specific construction and arrangement of parts that would be employed in practice.

The symbols (+) and (−) are employed to indicate the positive and negative terminals respectively of suitable batteries or other sources of direct current; and the circuits with which these symbols are used, are assumed to have current flowing in the same direction. However, it is to be understood that should alternating current be employed instead of direct current, such symbols would merely indicate the relative instantaneous polarities.

It is also to be understood that although the embodiment of the present invention herein disclosed is for the control of a garage door, two electric lights and the night latch of a residence door, the utility of the system is not to be considered as limited to use in the control of these devices.

Figure 1:
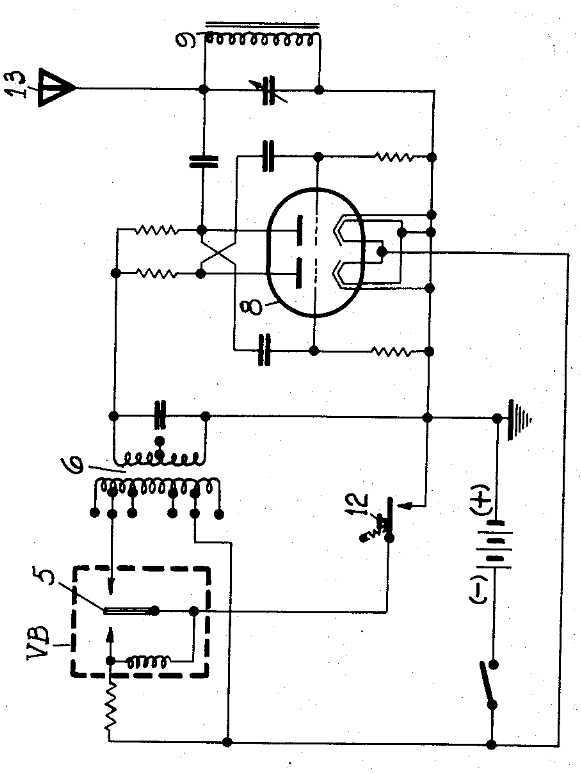
Fig. 1 is a diagrammatic representation of the circuits and devices employed in the mobile transmitter of a system embodying the present invention.

Referring to Fig. 1, it will be noted that the transmitter comprises self restoring pushbutton 12, the contacts of which are normally open; and a standard 4-prong mechanical vibrator VB which is initiated by depressing pushbutton 12.

Figure 4:
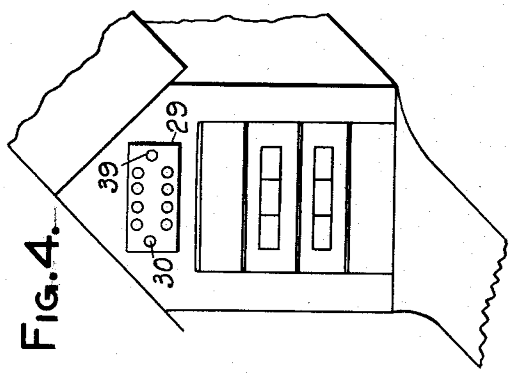
Fig. 4 is a view showing the location of a signal on the front of a garage.
Figures 3A, 3B:
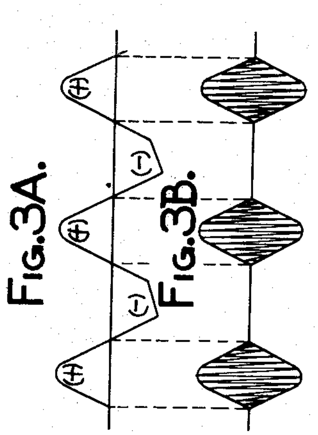
Fig. 3A is a curve representing the input to the multivibrator of the transmitter.
Fig. 3B is a curve representing the carrier output of the transmitter.

Also there is an output transformer 6, the tapped low voltage primary winding of which is energized by the mechanical vibrator VB. A twin triode vacuum tube 8 is provided to operate as a free-running multivibrator. The voltage for its operation is obtained by connection to the high voltage secondary winding of the output transformer 6. As the A. C. wave shape of the transformer 6 output when energized in one direction only has only one half cycle resembling a sine wave, it is so connected to the free-running multivibration that this sine wave half cycle is positive as applied to the input of the multivibrator 8, as shown by Fig. 3A.

The transmitter (see Fig. 1) also includes an aerial 13 which is connected to one plate of the free-running multivibrator 8 and a variable condenser tuned tank circuit 9, which is connected to aerial 13, filtering the carrier output and feeding back to the free-running multivibrator and thereby maintaining its frequency in step with the tuning of the tank circuit.

In this arrangement, when the operator depresses pushbutton 12 it causes the mechanical vibrator to operate and in turn causes an A. C. voltage output of the high volt secondary winding of transformer 6 to be applied to the free-running multivibrator 8. As a vacuum tube operates only on positive energy the free-running multivibrator operates only on the positive half cycles. Therefore the carrier output resembles 200% modulation by A. C. sine waves, as shown by Fig. 3B.

Figure 2A:
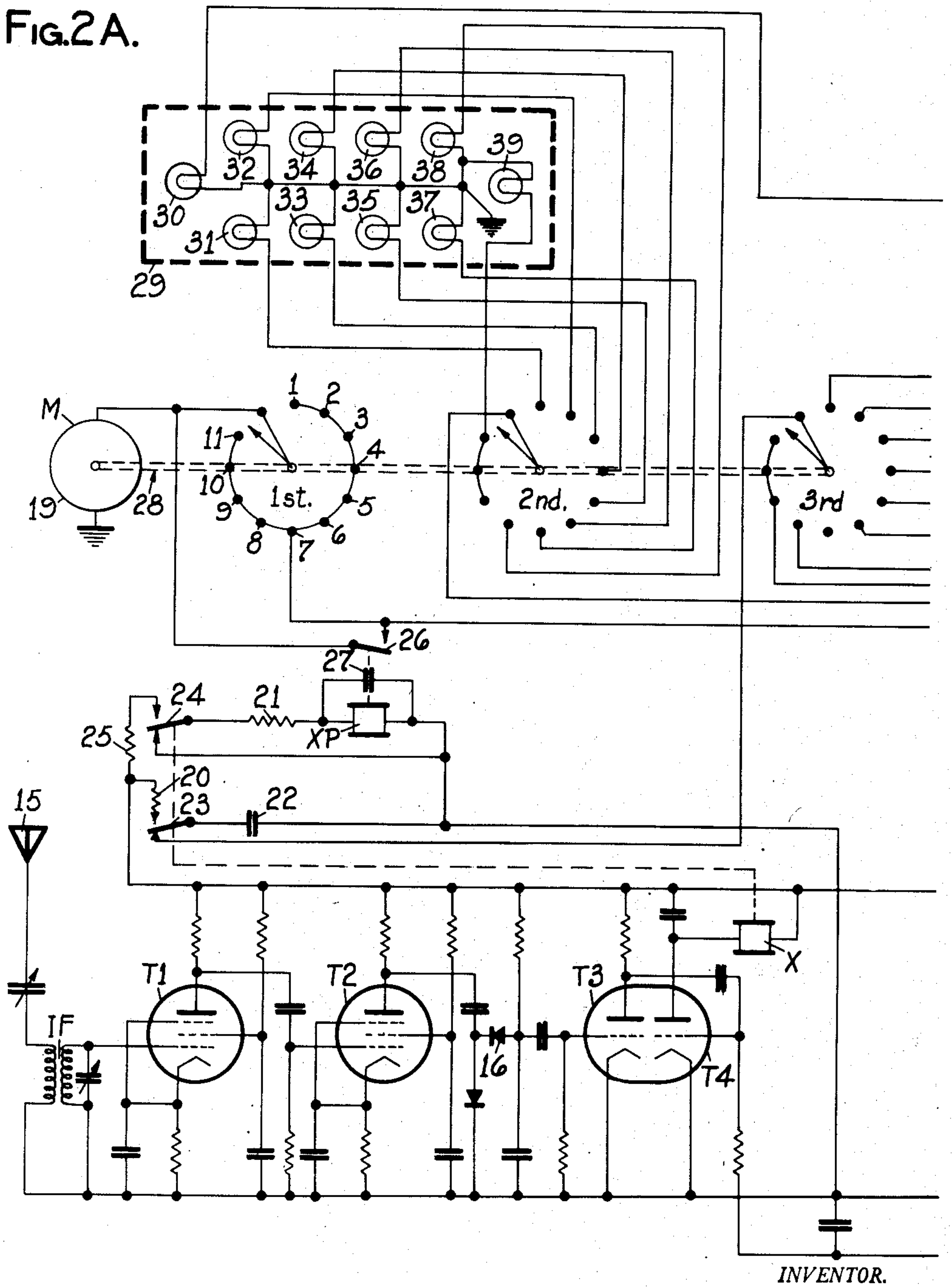
Figs. 2A and 2B are diagrammatic representations of the circuits and devices employed at a receiving station in a system embodying the present invention.
Figure 2B:
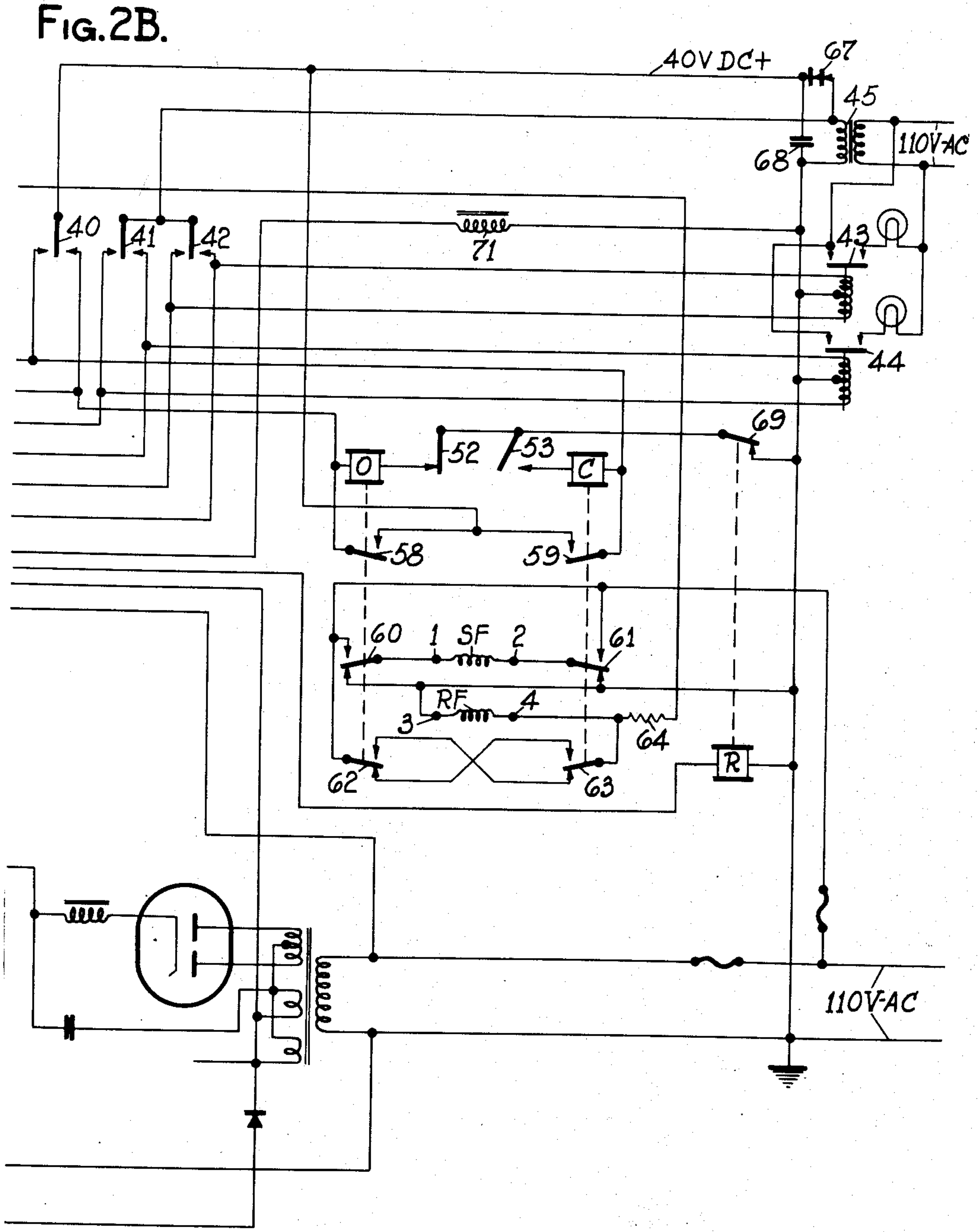

Referring to Figs. 2A and 2B, it will be noted that the conventional carrier receiver at the receiving station comprises an aerial 15, an input I. F. transformer, 1st R. F. amplifier T1, a 2nd R. F. amplifier T2, a crystal diode detector 16, a 1st audio amplifier T3. Also a control relay X which is in the plate circuit of the 2nd audio amplifier T4 and picked up when carrier is received from the mobile unit.

The fixed station also includes a repeater relay XP controlled through front contact 24 of relay X. This relay is made to have slow pickup by series resistance 25 and parallel condenser 27. This repeater relay XP is provided so that the scanning of the control and signal will not be started by a short energization of control relay X, as may occur due to transients or bursts of static, but rather requires a prolonged energization of the X relay as will occur under normal operation by the operator from the mobile unit.

Stepping at the receiving station is accomplished by a motor driven rotary switch 28 with 3 multiple contact gangs or wafers. This rotary switch is stated by contact 26 of relay XP closing A. C. + to motor 19.

The first gang of the motor driven rotary switch also closes A. C. + to the motor after it starts so that it will always complete the revolution to the off or normal position after the XP relay drops away. The 2nd gang successively energizes the step lights in signal 29, indicating to an operator of the transmitter the progress of stepping so that he may know the time periods in which to transmit controls for the devices he desires operated on the respective steps.

The 3rd gang of the motor driven rotary switch has contacts corresponding to the 2nd gang which select the controls. Control energy is fed to the rotating finger and the fixed contacts are connected to the several devices to be operated.

It will be noted that the receiver high volt (+) is connected to front contact 24 of the relay X through resistance 25 to energize repeater relay XP. Back contact 24 is connected to the grounded side of relay XP and condenser 27 so that when contact 24 is opened it discharges condenser 27. Resistor 21 is to limit the current and prevent burning back contact 24 in discharging condenser 27.

With this arrangement relay X must be steadily picked up for 2 or 3 seconds to pick up relay XP. A momentary dropaway of relay X will discharge condenser 27 so that another period of 2 to 3 seconds is required to recharge condenser 27 to the voltage required to pick up relay XP.

The receiver high volt (+) is connected to front contact 23 through current limiting resistor 20 to charge condenser 22 which is connected between the heel of contact 23 and ground. Back contact 23 is connected to the rotary finger of the 3rd gang of rotary switch 28. Thus when the relay X picks up, as when the operator presses pushbutton 12 in the mobile unit, it changes condenser 22 and when it opens, as when the operator releases button 12, it discharges this condenser to the motor driven rotary switch and in turn to the control selected by the 3rd gang.

This Fig 2B also shows a remote control system comprising remote control relays 43 and 44, remote control switches 41 and 42, and remote control transformer 45 for control of a garage light and an area light. This organization is included to show how the present invention can be applied to operate a number of different devices without making any changes or affecting the normal operation of the system. If the control to be operated from the mobile unit was one of the lights, the charge from condenser 22 would be applied to the same control wire that would be energized by the manual switch if that control was so operated. Normally the remote control relays 43 or 44 are operated by A. C. from transformer 45 through manual switch 41 or 42, but they operate equally well from the D. C. pulse discharge from condenser 22.

Also shown in Figs. 2B is door unlock 71. This consists of a solenoid with a spring returned plunger. This solenoid is located back of the latch plate opposite the button that removes the night latch. When energized by the discharge of condenser 22, the plunger protrudes removing the night latch so that a key is not necessary to open the door.

A split phase motor is shown for operating a garage door having a starting field SF and a running field RF. The relays O and C (opening and closing respectively) govern the operation of this motor. Relay R is provided to permit reversal of this split phase motor.

A rectifier 67 and an associated filtering condenser 68 are used to rectify the output of transformer 45 to produce a direct current output for sticking the O and C relays and for the manual operation of these relays by means of switch 40.

*Operation*

Let us assume that the operator of the mobile unit wished to open the garage door, light the area lamp, light the garage lamp, and remove the night latch from the residence door. He would depress push button 12 in the mobile unit and observe signal 29, and as each of the following lamps lighted 32, 34, 36 and 38, became illuminated, he would momentarily release pushbutton 12 during illumination of the respective lamps to execute these controls.

When the operator depresses pushbutton 12 in the mobile unit it closes the circuit from (—) battery to the transmitter and a modulated carrier is radiated from the mobile unit aerial.

At the receiving station this signal is picked up by the receiver aerial, amplified and detected. The detected signal is amplified and used to energize relay "X."

When relay X picks up it charges condenser 22 through front contact 23, and after 2 or 3 seconds of uninterrupted energization, picks up relay XP through front contact 24.

When relay XP picks up it starts motor driven rotary switch 28, which then scans the step indicating lights 31 to 39 in signal 29. As lamp 32 lights, indicating step 2, associated with which is the opening of the garage door, the operator releases pushbutton 12 momentarily, thus stopping the radiated signal and momentarily releases relay X. When relay X drops away, condenser 22 discharges through back contact 23 to the 3rd gang of the rotary switch, out contact 2 to the coils of the "O" relay, picking it up, which then sticks up by current through its own front contact 58.

Likewise, when lamp 34 lights indicating step 4, associated with which is the lighting of the area lamp, the operator again momentarily releases pushbutton 12 and in turn causes relay X to drop away momentarily, again discharging condenser 22 through contact 23 to the 3rd gang of the rotary switch, and out contact 4 to the upper coil of remote control relay 44, picking it up and thus closing the circuit to the area lamp. These remote control relays are of a structure to remain in the last position energized.

When lamp 36 lights, indicating step 6, the operator again momentarily releases pushbutton 12 in turn releasing relay X. Condenser 22 again discharges through back contact 23 to the 3rd gang of the rotary switch which is now in position 6 and the current from the condenser flows through contact 6 to the upper coil of remote control relay 43 closing the circuit to the garage lamp.

The last control we have set forth to operate is the door unlock. Therefore, when signal lamp 38 lights, the operator releases pushbutton 12 and leaves it released as he need not pick up relay X to again charge condenser 22.

Again as relay X drops away, condenser 22 discharges through back contact 23 and out contact 8 of the 3rd gang of the rotary switch, through the coil of the solenoid back of the latch plate in the residence door frame. The plunger protrudes and pushes back the button that releases the night latch so that the door may be opened without using a key.

If the controls set forth for description of operation had been to close the garage door and turn out the area and garage lights, the operator would have released pushbutton 12 on the lighting of signal lamps 31, 33, and 35. The principle of operation would have been the same except that condenser 22 would have discharged to the relay C in step one and to the lower coils of remote control relays 43 and 44.

*Motor operation*

When the executed control is such that condenser 22 is discharged to relay O, relay O picks up and sticks up through its own contact 58 from the 40 volt D. C.+bus. Front contact 60 connects 110 v. A. C.+ to post 1 of the starting field (SF). Post 2 of this field is connected to 110 v. A. C.—, through back contact 61. One side of the running field RF, post 3 is permanently connected to 110 v. A. C.—, while the other post 4 is connected to 110 v. A. C.+, through back contact 63 and front contact 62. This arrangement starts the motor in the direction to open the door. If there is no interference the door will operate to the full open position where limit switch 52 will open and deenergize relay O thus removing 110 v. A. C.+ energy from the motor.

If the door had been fully open with limit switches 52 open and 53 closed and the control to be executed such that condenser 22 was discharged to relay "C," it would pick up and stick up through its own contact 59 from the 40 v. D. C.+ bus. In this case front contact 61 connects 110 v. A. C.+ to post 2 of the starting field, SF, leaving the other post 1 of the starting field connected to 110 v. A. C.— through back contact 60. 110 v. A. C.+ would again be connected to post 4 of the running field RF, but now through front contact 63 and back contact 62. With the polarity of the starting field now reversed the motor will start in the direction to close the door.

If not interrupted the door will move to the fully closed position where limit switch 53 will open and in turn open the circuit for relay C and the 110 v. A. C.+ applied to the motor.

Should the door fail to complete an operation to open the limit switch and stop the motor, as when some obstruction is under the door so that it cannot close, the operator may execute the control that picks up relay R which will open the O or C relay by back contact 69 opening and removing negative energy from these relays.

Although I have herein shown and described only certain specific applications of the carrier control system according to the present invention, it is to be understood that various changes and modifications may be made therein within the scope of the appending claims without departing from the spirit and scope of my invention.

What I claim is:

1. In a carrier wave system of communication for the selective control of a plurality of devices at a fixed receiving station from a mobile transmitting station, a mobile carrier wave transmitter having manually operable means effective when actuated to render the transmitter active to transmit a modulated carrier wave only so long as the manually operable means is retained in its actuated position, a carrier receiver at the receiving station having a normally inactive stepping switch effective when initiated to be self-propelled through a complete cycle of operation, said stepping switch having a step for each device to be governed from the mobile station, said receiver being effective to initiate said stepping switch upon receiving a modulated carrier wave transmitted by said mobile transmitter, a multiple aspect signal at said receiving station having a distinctive aspect for each step of said stepping switch, said signal being disposed within view of an operator of said mobile transmitter, circuit means including contacts of said stepping switch governing the energization of said signal to display its respective aspect successively as the stepping progresses, circuit means for actuating a device associated with any step only in response to the cessation of the reception of modulated carrier waves from said mobile transmitter during that step, whereby a device having its control associated with any particular step is operated during a cycle of operation of the switch only provided that the operator of the mobile transmitter restores his manually operable means rendering his transmitter effective during the associated step.

2. A carrier wave system of communication for the selective control from a mobile station of a plurality of devices at a fixed receiving station comprising in combination, mobile carried transmitting apparatus having manually operable means effective when actuated to render the transmitting apparatus active to transmit a modulated carrier wave only so long as the manually operable means is retained in its actuated position, carrier wave receiving apparatus at said receiving station having a normally inactive stepper effective when initiated to be self-propelled through a complete cycle of operation, said stepper having a step for each device to be governed from the mobile station, said carrier wave receiving apparatus being effective to initiate said stepper upon receiving a modulated carrier wave transmitted by said transmitting apparatus, a multiple aspect signal at said receiving station having a distinctive aspect for each step of said stepper, said signal being disposed within view of an operator of said mobile transmitting apparatus, circuit means including contacts of said stepper for governing the energization of said signal to display its aspects successively as the stepping progresses, and circuit means for actuating a device associated with any step only upon cessation of carrier wave reception during that step.

FRANK X. REES.

References Cited in the file of this patent

UNITED STATES PATENTS

| Number | Name | Date |
| --- | --- | --- |
| 2,222,218 | Wallace | Nov. 19, 1940 |
| 2,229,097 | Koenig | Jan. 21, 1941 |
| 2,627,063 | Richards | Jan. 27, 1953 |